United States Patent
Kato et al.

(10) Patent No.: US 12,292,591 B2
(45) Date of Patent: May 6, 2025

(54) LIGHTING DEVICE AND THREE-DIMENSIONAL VIDEO DISPLAY DEVICE

(71) Applicant: Nichia Corporation, Anan (JP)

(72) Inventors: Masaru Kato, Sagamihara (JP); Hiroshi Miyairi, Yokohama (JP)

(73) Assignee: Nichia Corporation, Anan (JP)

( * ) Notice: Subject to any disclaimer, the term of this patent is extended or adjusted under 35 U.S.C. 154(b) by 0 days.

(21) Appl. No.: 18/562,747

(22) PCT Filed: Feb. 22, 2022

(86) PCT No.: PCT/JP2022/007347
§ 371 (c)(1),
(2) Date: Nov. 20, 2023

(87) PCT Pub. No.: WO2023/281804
PCT Pub. Date: Jan. 12, 2023

(65) Prior Publication Data
US 2024/0272344 A1    Aug. 15, 2024

(30) Foreign Application Priority Data
Jul. 7, 2021   (JP) .................................. 2021-112983

(51) Int. Cl.
*F21V 8/00*   (2006.01)
(52) U.S. Cl.
CPC ........... *G02B 6/003* (2013.01); *G02B 6/0031* (2013.01)
(58) Field of Classification Search
CPC .............................. G02B 6/003; G02B 6/0031
See application file for complete search history.

(56) References Cited

U.S. PATENT DOCUMENTS

| 5,642,933 A | 7/1997 | Hitora | |
|---|---|---|---|
| 2003/0035298 A1* | 2/2003 | Amano | F21S 43/14 362/544 |

(Continued)

FOREIGN PATENT DOCUMENTS

| JP | H07-201210 A | 8/1995 |
|---|---|---|
| JP | 2002-042523 A | 2/2002 |

(Continued)

OTHER PUBLICATIONS

International Search Report dated Apr. 5, 2022, mailed in counterpart International Application No. PCT/JP2022/007347, 10 pages.

*Primary Examiner* — Donald L Raleigh
(74) *Attorney, Agent, or Firm* — Kim & Stewart LLP

(57) ABSTRACT

A lighting device includes a light source, a lens receiving light from the light source, and a reflector including multiple first reflecting regions, wherein each first reflecting region reflects light from the lens in a first direction crossing an optical axis of light incident on the lens. The first reflecting regions are arranged with steps interposed therebetween so that the regions further toward a light-emitting side of the reflector in the first direction have greater distances from the lens in a second direction in which the optical axis extends. A light distribution angle of light from a first part of the lens further toward the light-emitting side than the optical axis in the first direction is less than a light distribution angle of light from a second part of the lens further toward a side opposite to the light-emitting side than the optical axis in the first direction.

19 Claims, 7 Drawing Sheets

(56) References Cited

U.S. PATENT DOCUMENTS

| | | |
|---|---|---|
| 2010/0195022 A1 | 8/2010 | Shikii et al. |
| 2014/0036361 A1 | 2/2014 | Woodgate et al. |
| 2016/0139322 A1 | 5/2016 | Bang et al. |
| 2017/0269278 A1 | 9/2017 | Fukuma et al. |
| 2019/0072240 A1 | 3/2019 | Dodo et al. |
| 2019/0265472 A1 | 8/2019 | Sugiyama et al. |
| 2021/0063752 A1 | 3/2021 | Takeda et al. |

FOREIGN PATENT DOCUMENTS

| | | |
|---|---|---|
| JP | 2003-059312 A | 2/2003 |
| JP | 2003-317508 A | 11/2003 |
| JP | 2005-129409 A | 5/2005 |
| JP | 2014-093174 A | 5/2014 |
| JP | 2015-525497 A | 9/2015 |
| JP | 2016-100340 A | 5/2016 |
| JP | 2017-147025 A | 8/2017 |
| JP | 2017-168253 A | 9/2017 |
| JP | 2018-124491 A | 8/2018 |
| JP | 2019-003081 A | 1/2019 |
| JP | 2021-033153 A | 3/2021 |
| WO | 2009/011122 A1 | 1/2009 |

* cited by examiner

LIGHTING DEVICE AND THREE-DIMENSIONAL VIDEO DISPLAY DEVICE

CROSS-REFERENCE TO RELATED APPLICATIONS

The present application claims priority under 35 U.S.C. § 119 to Japanese Patent Application No. 2021-112983, filed Jul. 7, 2021, the contents of which are hereby incorporated by reference in their entirety.

BACKGROUND

1. Technical Field

The invention relates to a lighting device and a three-dimensional image display device.

2. Description of Related Art

International Publication No. 2009/011122 discusses a device in which light emitted by a light source is collimated by a lens; and the travel direction of light emitted from the lens is modified by a reflecting surface reflecting the light emitted from the lens.

SUMMARY

An embodiment of the invention is directed to provide a compact lighting device and three-dimensional image display device.

A lighting device according to an embodiment of the invention includes a light source, a lens on which light emitted from the light source is incident, and a reflector including multiple first reflecting regions, wherein each of the first reflecting regions reflects light emitted from the lens in a first direction crossing an optical axis of light incident on the lens. The multiple first reflecting regions are arranged with steps interposed between the multiple first reflecting regions so that the first reflecting regions positioned further toward a light-emitting side of the reflector in the first direction have greater distances from the lens in a second direction in which the optical axis extends. A light distribution angle of light emitted from a first part of the lens positioned further toward the light-emitting side than the optical axis in the first direction is less than a light distribution angle of light emitted from a second part of the lens positioned further toward an opposite side than the optical axis in the first direction, wherein the opposite side is opposite to the light-emitting side.

A three-dimensional image display device according to an embodiment of the invention includes the aforementioned lighting device, and a display member configured to display a three-dimensional image by light emitted from the lighting device being incident on the display member.

According to an embodiment of the invention, a compact lighting device and three-dimensional image display device can be provided.

BRIEF DESCRIPTION OF THE DRAWINGS

A more complete appreciation of embodiments of the invention and many of the attendant advantages thereof will be readily obtained by reference to the following detailed description when considered in connection with the accompanying drawings.

Figure 1:
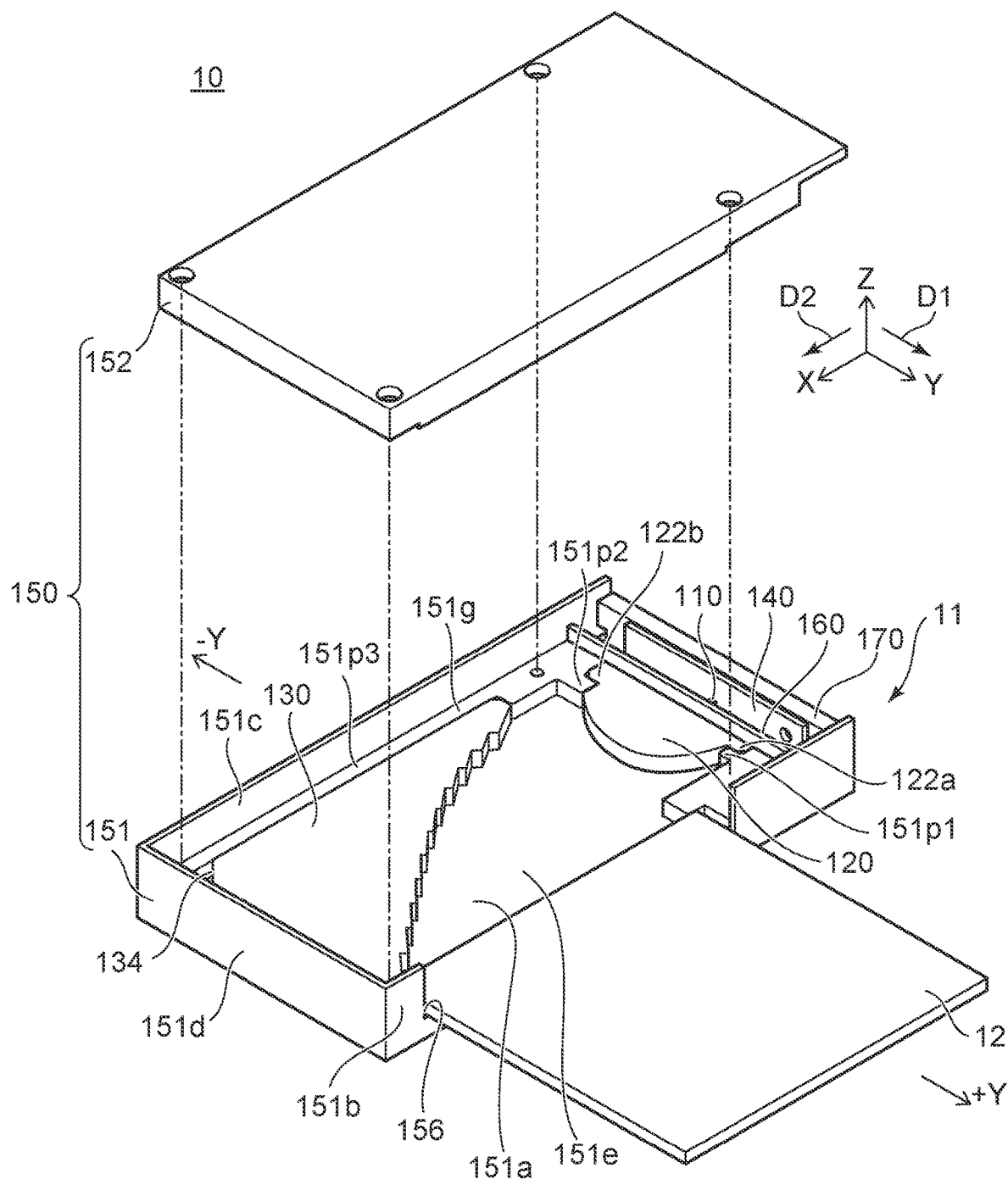
FIG. 1 is an exploded perspective view showing a three-dimensional image display device including a lighting device and a display member according to a first embodiment.

Embodiments will now be described with reference to the drawings. The drawings are schematic or conceptual; and the relationships between the thickness and width of portions, the proportions of sizes among portions, etc., are not necessarily the same as the actual values. Also, the dimensions and proportions may be illustrated differently among drawings, even when the same portion is illustrated. Furthermore, in the specification and drawings, components similar to those described previously or illustrated in an antecedent drawing are marked with the same reference numerals; and a detailed description is omitted as appropriate.

Also, for easier understanding of the following description, the arrangements and configurations of the portions are described using an XYZ orthogonal coordinate system. An X-axis, a Y-axis, and a Z-axis are orthogonal to each other. Also, the direction in which the X-axis extends is taken as an "X-direction"; the direction in which the Y-axis extends is taken as a "Y-direction"; and the direction in which the Z-axis extends is taken as a "Z-direction". Also, although the Z-direction also is called the upward direction and the opposite direction of the Z-direction also is called the downward direction hereinbelow, these directions are independent of the direction of gravity.

Also, hereinbelow, "parallel" means parallel within a practical range that allows errors caused by the manufacturing accuracy, assembly accuracy, etc.

FIRST EMBODIMENT

First, a first embodiment will be described.

FIG. 1 is an exploded perspective view showing a three-dimensional image display device including a lighting device and a display member according to the embodiment.

Figure 2:
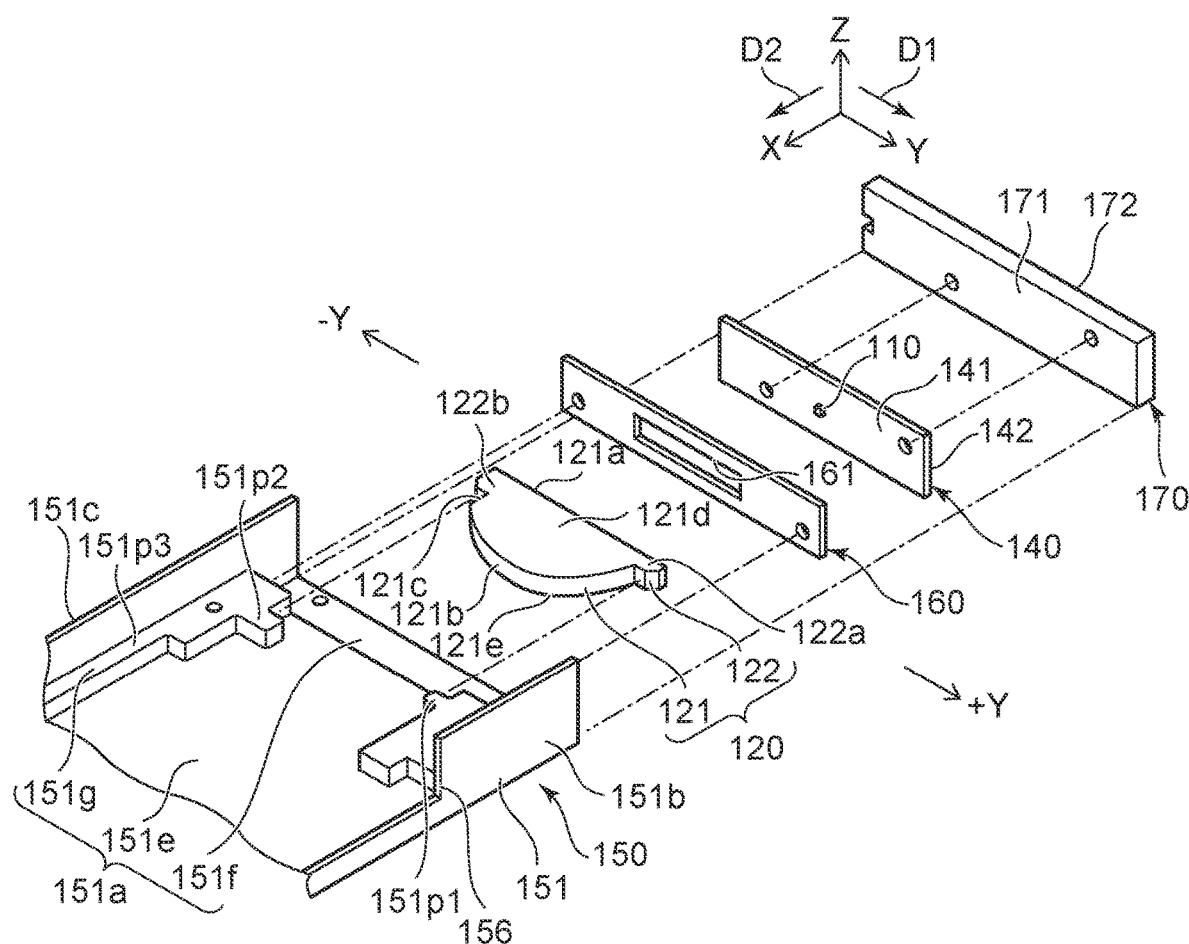
FIG. 2 is an exploded perspective view showing a portion of the three-dimensional image display device according to the first embodiment.

FIG. 2 is an exploded perspective view showing a portion of the three-dimensional image display device according to the embodiment.

Figure 3:
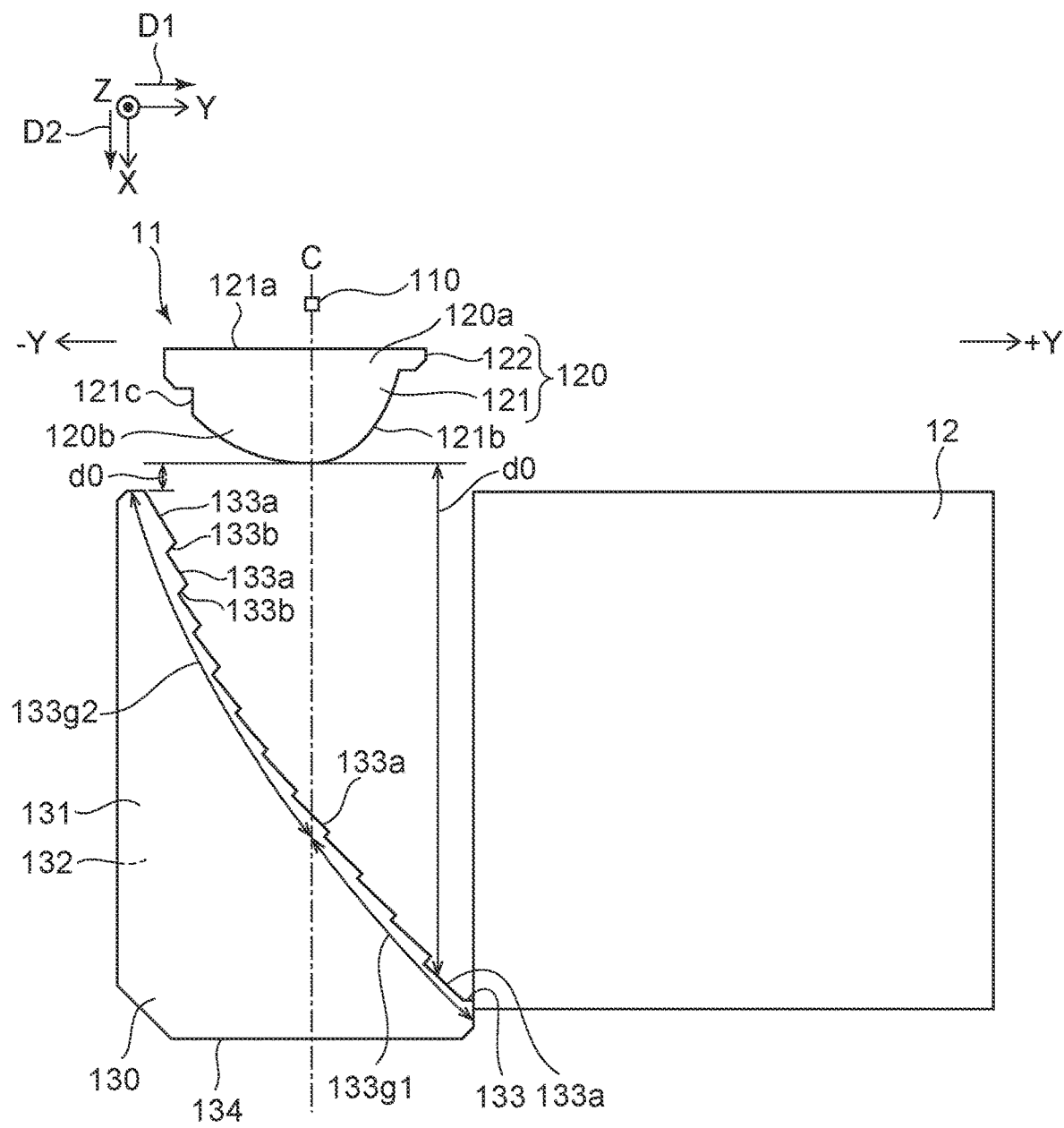
FIG. 3 is a top view showing a light source, a lens, a reflector, and the display member of the three-dimensional image display device according to the first embodiment.

FIG. 3 is a top view showing a light source, a lens, a reflector, and the display member of the three-dimensional image display device according to the embodiment.

Figure 4:
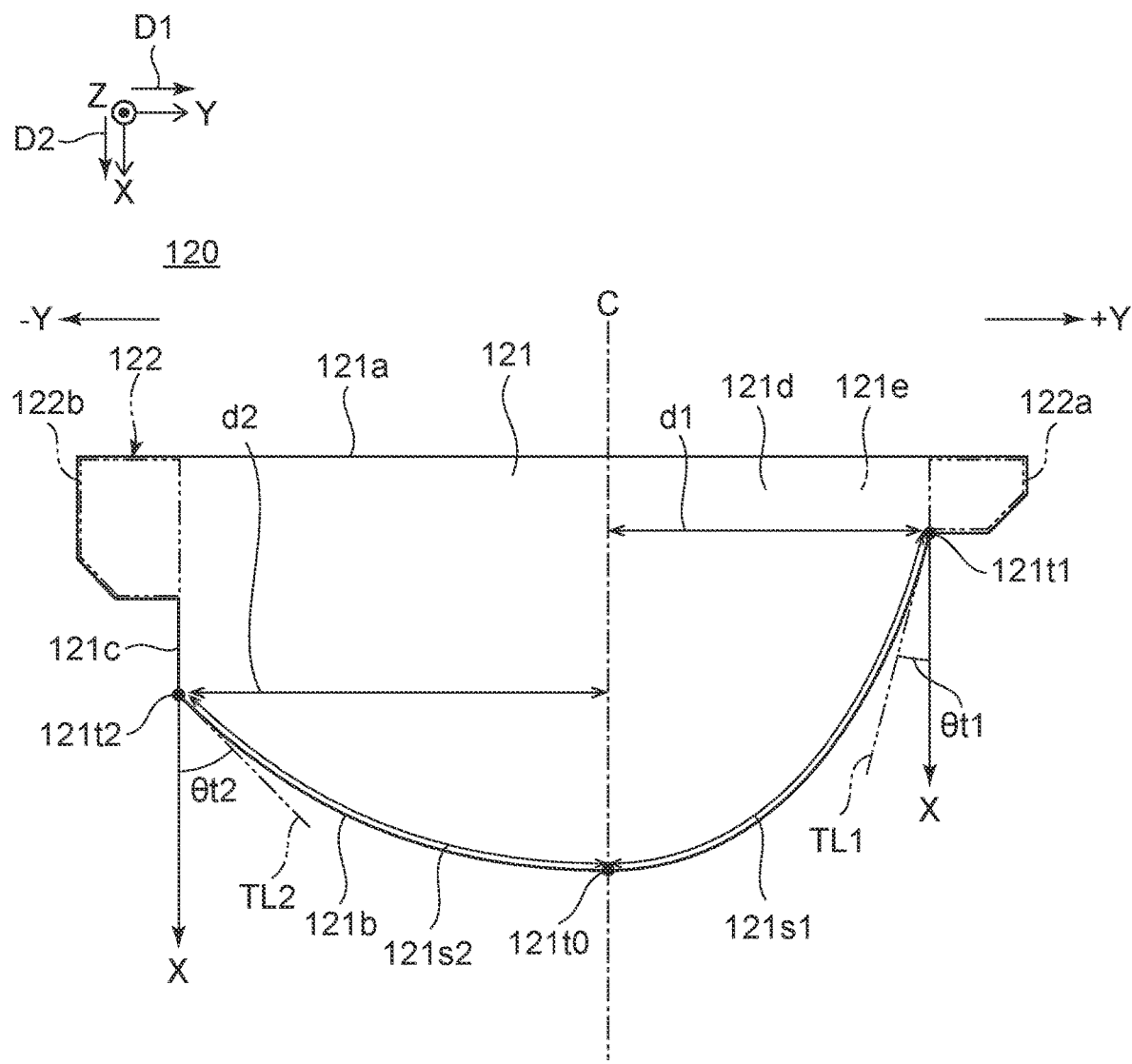
FIG. 4 is a top view showing the lens of the three-dimensional image display device according to the first embodiment.

FIG. 4 is a top view showing the lens of the three-dimensional image display device according to the embodiment.

Figure 5:
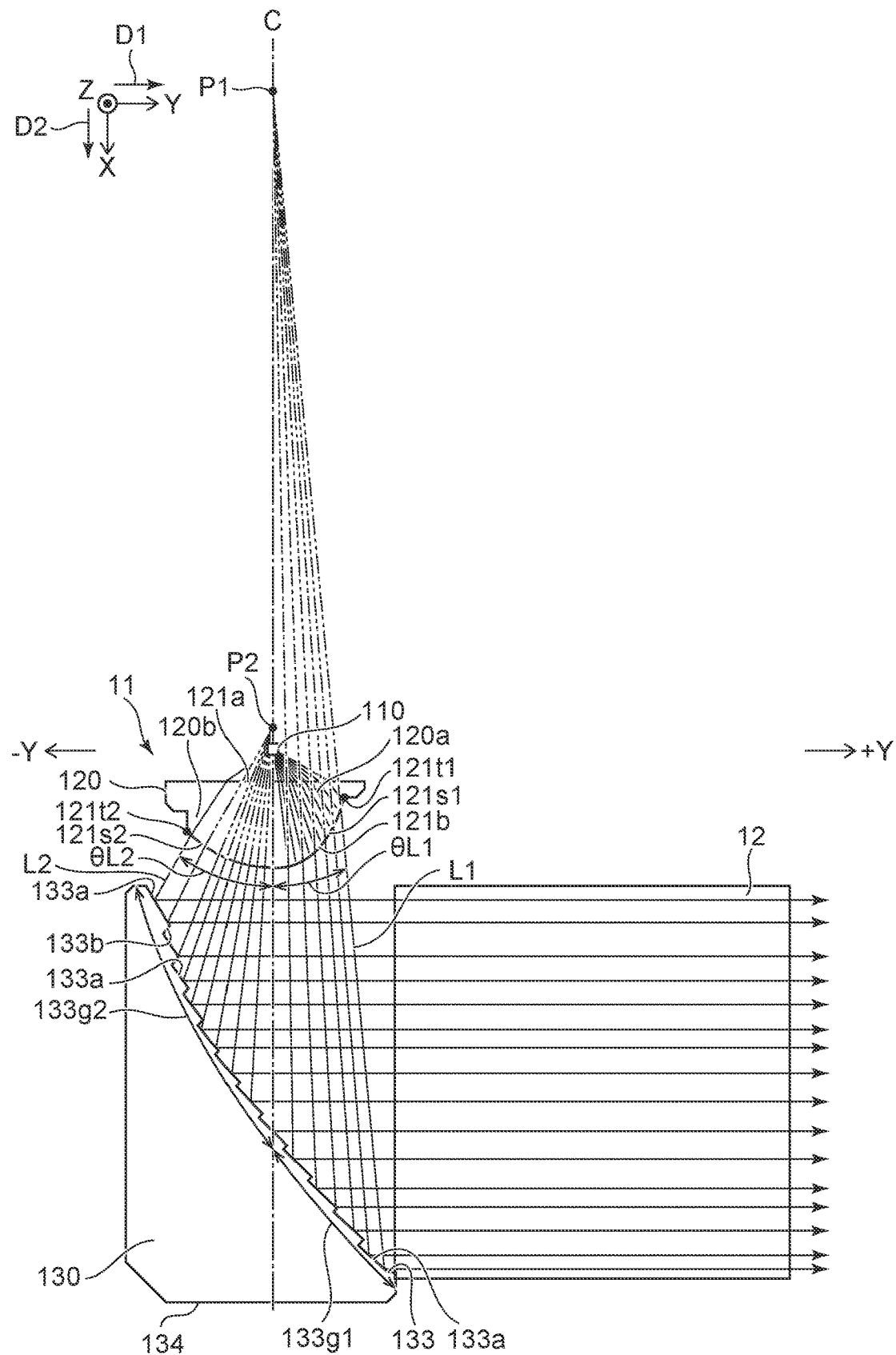
FIG. 5 is a schematic view showing paths of light of the three-dimensional image display device according to the first embodiment.

FIG. 5 is a schematic view showing paths of light of the three-dimensional image display device according to the embodiment.

Generally speaking, as shown in FIG. 3, the lighting device 11 according to the embodiment includes the light source 110, the lens 120, and the reflector 130. Light that is emitted from the light source 110 is incident on the lens 120. The reflector 130 includes multiple reflecting regions 133a; and as shown in FIG. 5, each reflecting region 133a reflects light emitted from the lens 120 in a first direction D1, wherein the first direction D1 crosses an optical axis C of the light emitted from the light source 110 and incident on the lens 120. According to the embodiment, the first direction D1 is the Y-direction. "The optical axis C of the light incident on the lens 120" means a straight line that passes through a position at one plane crossing the light incident on the lens 120 at which the illuminance of the light emitted from the light source 110 has a maximum and through a position at another plane separated from the one plane and crossing the light incident on the lens 120 at which the illuminance of the light has a maximum.

As shown in FIG. 3, the multiple reflecting regions 133a are arranged with steps 133b interposed between the multiple reflecting regions 133a so that the reflecting regions 133a positioned further toward the light-emitting side +Y of the reflector 130 in the first direction D1 have greater distances do from the lens 120 in a second direction D2 in which the optical axis C extends. According to the embodiment, the second direction D2 is the X-direction and is orthogonal to the first direction D1. However, the second direction D2 may not be orthogonal to the first direction D1.

As shown in FIG. 5, a light distribution angle θL1 of the light emitted from a first part 120a of the lens 120 positioned further toward the light-emitting side +Y than the optical axis C in the first direction D1 is less than a light distribution angle θL2 of the light emitted from a second part 120b of the lens 120 positioned further toward the opposite side −Y of the light-emitting side +Y than the optical axis C in the first direction D1. In other words, light distribution angle θL1<light distribution angle θL2. For example, the light distribution angles θL1 and θL2 can be measured by methods conforming to JIS C 8105-5:2011.

As shown in FIG. 1, the lighting device 11 may further include a substrate 140, a housing 150, a light-shielding member 160, and a support member 170 in addition to the light source 110, the lens 120, and the reflector 130 described above. The light source 110 is located at the substrate 140. The housing 150 houses the light source 110, the lens 120, the reflector 130, the substrate 140, and the light-shielding member 160. The light-shielding member 160 controls the light from the light source 110 that is incident on the lens 120. The support member 170 supports the substrate 140.

According to the embodiment, the lighting device 11 is used in combination with a display member 12. The display member 12 displays a three-dimensional image above the display member 12 by the light emitted from the lighting device 11 being incident on the display member 12. Hereinbelow, the device in which the lighting device 11 and the display member 12 are combined is called the "three-dimensional image display device 10".

However, the lighting device may be used in combination with another member instead of being used in combination with the display member. Examples of using the lighting device in combination with another member include an example of using as an area sensor device in which infrared light is emitted from the lighting device, the infrared light is used as a light curtain, and a detector that can detect the light curtain is combined with the lighting device. Also, the lighting device may be used alone. Examples of the lighting device being used alone include an example of using as a sterilization device in which ultraviolet light is emitted from the lighting device, or an example of using as wall lighting with a dimmable light source. Components of the three-dimensional image display device 10 will now be elaborated.

Lighting Device

The substrate 140 includes an insulating layer and wiring parts. As shown in FIG. 2, the substrate 140 has a flat plate shape. The substrate 140 includes a front surface 141 that is a flat surface parallel to the YZ-plane, and a back surface 142 that is positioned at the side opposite to the front surface 141, is a flat surface, and is parallel to the YZ-plane. The light source 110 is located on the front surface 141.

However, the shape of the substrate is not limited to the shape described above. Also, instead of a substrate, the light source may be held by a holder including wiring parts, etc.

The light source 110 includes a light-emitting element and a wavelength conversion member. The light-emitting element is an LED (Light-Emitting Diode), a LD (Laser Diode), etc. The light-emitting element is electrically connected to wiring parts of the substrate 140. The wavelength conversion member absorbs a portion of the light emitted by the light-emitting element and emits light of a different light emission peak wavelength from the light emission peak wavelength emitted by the light-emitting element. The wavelength conversion member includes, for example, a fluorescer.

As shown in FIG. 5, the optical axis C of the light emitted from the light source 110 extends in the X-direction. According to the embodiment, the light source 110 emits visible light. The light source 110 may emit mixed light of the light emitted by the light-emitting element and the light emitted by the wavelength conversion member. Also, the greater part of the light emitted by the light-emitting element may be absorbed by the wavelength conversion member; and the light source 110 may mainly emit the light emitted by the wavelength conversion member.

However, the configuration of the light source is not limited to the configuration described above. For example, the light source may not include the wavelength conversion member. In such a case, the light that is emitted by the light-emitting element is emitted from the light source. Also, the light source may be configured to emit ultraviolet light, infrared light, or monochromatic light in the visible region according to the application of the lighting device.

The lens 120 is located on the optical axis C. The light that is emitted by the light source 110 is incident on the lens 120. According to the embodiment as shown in FIG. 4, the lens 120 includes a main part 121 and a flange part 122. It is favorable for the lens 120 to be a resin material such as acrylic (PMMA), polycarbonate (PC), or the like, a light-transmitting material such as quartz glass, etc. It is favorable for the refractive index of the light-transmitting material included in the lens 120 to be about 1.4 to 1.9. However, the refractive index of the light-transmitting material included in the lens is not limited to this range.

When viewed in top-view, the main part 121 has an asymmetric shape with respect to the optical axis C. Specifically, the surface of the main part 121 includes a light incident surface 121a, a light-emitting surface 121b, a side surface 121c, an upper surface 121d, and a lower surface 121e.

The upper surface 121d is a flat surface parallel to the XY-plane. The lower surface 121e is positioned below the upper surface 121d. The lower surface 121e is a flat surface parallel to the XY-plane.

The light incident surface 121a is positioned between the upper surface 121d and the lower surface 121e and faces the light source 110. The light that is emitted by the light source 110 is incident on the light incident surface 121a. According to the embodiment, the light incident surface 121a is a flat surface parallel to the YZ-plane.

However, the light incident surface may be a curved surface.

The light-emitting surface 121b is positioned between the upper surface 121d and the lower surface 121e at the side opposite to the light incident surface 121a in the X-direction. The light-emitting surface 121b emits the light that is incident on the main part 121. The light-emitting surface 121b has a convex curved shape when viewed in top-view.

Specifically, the light-emitting surface 121b is a freeform surface. A vertex 121t0 in the X-direction of the light-emitting surface 121b is positioned substantially on the optical axis C. An angle θt1 between the X-direction and a tangent TL1 at a first end portion 121t1 of the light-emitting surface 121b at the light-emitting side +Y in the Y-direction is less than an angle θt2 between the X-direction and a tangent TL2 at a second end portion 121t2 of the light-emitting surface 121b at the opposite side −Y of the Y-direction. In other words, angle θt1<angle θt2. Therefore, as shown by the solid lines in FIG. 5, the refraction angle of a light L1 that is incident on the main part 121 from the light source 110 and emitted from the first end portion 121t1 is greater than the refraction angle of a light L2 that is incident on the lens 120, is incident on the main part 121 from the light source 110, and is emitted from the second end portion 121t2. As a result, the angle between the light L1 and the optical axis C is less than the angle between the light L2 and the optical axis C. As a result, the light distribution angle θL1 emitted from a first region 121s1 of the light-emitting surface 121b positioned further toward the light-emitting side +Y than the optical axis C in the Y-direction is less than the light distribution angle θL2 of the light emitted from a second region 121s2 of the light-emitting surface 121b positioned further toward the opposite side −Y than the optical axis C in the Y-direction. As a result, the spreading of the light emitted from the lens 120 toward the light-emitting side +Y in the Y-direction can be suppressed.

Also, as shown in FIG. 4, a length d1 in the Y-direction of the first region 121s1 is less than a length d2 in the Y-direction of the second region 121s2. As a result, spreading of the light emitted from the lens 120 toward the light-emitting side +Y in the Y-direction can be further suppressed. However, the size relationship of these lengths is not limited to that described above.

The side surface 121c is connected to the second end portion 121t2 of the light-emitting surface 121b between the upper surface 121d and the lower surface 121e and extends toward the light incident surface 121a but does not reach the light incident surface 121a. The side surface 121c is, for example, a flat surface parallel to the XZ-plane. However, the side surface may be a curved surface. Also, the main part may not include the side surface. Also, the main part 121 may include another side surface that is connected to the first end portion 121t1 of the light-emitting surface 121b and extends toward the light incident surface 121a.

The flange part 122 includes a first flange part 122a protruding toward the light-emitting side +Y in the Y-direction from the end portion of the main part 121 proximate to the light source 110 in the X-direction, and a second flange part 122b protruding toward the opposite side −Y in the Y-direction from the end portion of the main part 121 proximate to the light source 110 in the X-direction. The first flange part 122a is connected to the end portion at the light-emitting side +Y of the light incident surface 121a in the Y-direction and to the first end portion 121t1 of the light-emitting surface 121b, and extends toward the light-emitting side +Y in the Y-direction. The second flange part 122b is connected to the end portion at the opposite side −Y of the light incident surface 121a in the Y-direction and to the end portion at the light incident surface 121a side of the side surface 121c in the X-direction, and extends toward the opposite side −Y in the Y-direction.

However, the shape of the lens is not particularly limited to the shape described above as long as light distribution angle θL1<light distribution angle θL2. For example, the lens may not include the flange part. Also, both the light incident surface and light-emitting surface of the lens may be continuous with curved surfaces. In such a case, for example, the surface at the light source side in the X-direction may be taken to be the light incident surface, and the surface at the reflector side in the X-direction may be taken to be the light-emitting surface, with boundaries at a first end point of the lens positioned at the end at the light-emitting side +Y in the Y-direction and at a second end point of the lens positioned at the end at the opposite side −Y.

It is favorable for the light emitted from the light-emitting surface 121b of the lens 120 to be non-parallel light. According to the embodiment, the light that is emitted from the light-emitting surface 121b of the lens 120 spreads in the Y-direction as the light approaches the reflector 130 in the X-direction as shown in FIG. 5.

As shown in FIG. 3, the reflector 130 is located on the optical axis C. In other words, the light source 110, the lens 120, and the reflector 130 are arranged on the optical axis C in this order. The reflector 130 reflects the light emitted from the lens 120 toward the Y-direction. The reflector 130 has a flat plate shape as shown in FIG. 1. According to the embodiment as shown in FIG. 3, the surface of the reflector 130 includes an upper surface 131, a lower surface 132, a reflecting surface 133, and a side surface 134.

The upper surface 131 is a flat surface parallel to the XY-plane. The lower surface 132 is positioned below the upper surface 131 and is a flat surface parallel to the XY-plane.

The reflecting surface 133 is positioned between the upper surface 131 and the lower surface 132 and faces the lens 120. The reflecting surface 133 includes the multiple reflecting regions 133a and the multiple steps 133b. As described above, the multiple reflecting regions 133a are arranged in one column with the steps 133b interposed between the multiple reflecting regions 133a so that the reflecting regions 133a positioned further toward the light-emitting side +Y in the Y-direction have greater distances do from the lens 120 in the X-direction. As a result, the Y-direction length of the reflector 130 can be less than when steps are not provided in the reflector. Also, the adjacent reflecting regions 133a partially overlap when viewed along the X-direction. Therefore, the Y-direction length of the reflector 130 can be even less. However, the adjacent reflecting regions may not overlap when viewed along the X-direction.

When viewed in top-view, the shape of each reflecting region 133a is, for example, a portion of a circumference. However, the shape of each reflecting region is not limited to such a shape. For example, the shape of each reflecting region may be a flat surface or may be another curved surface. Hereinbelow, a "first reflecting part 133g1" refers to the region further toward the light-emitting side +Y than the optical axis C in the Y-direction of the reflecting region 133a among the multiple reflecting regions 133a positioned on the optical axis C, and the reflecting regions 133a entirely positioned further toward the light-emitting side +Y than the optical axis C in the Y-direction. Also, a "second reflecting part 133g2" refers to the region further toward the opposite side −Y than the optical axis C in the Y-direction of the reflecting region 133a among the multiple reflecting regions 133a positioned on the optical axis C, and the reflecting regions 133a entirely positioned further toward the opposite side −Y than the optical axis C in the Y-direction.

As shown in FIG. 5, the first reflecting part 133g1 has a focal point at a first position P1 on the optical axis C. The second reflecting part 133g2 has a focal point at a second position P2 that is more proximate to the light source 110 than the first position P1 on the optical axis C. The light source 110 is positioned more proximate to the lens 120 than the first and second positions P1 and P2.

In FIG. 5, the paths of the light emitted from the light source 110 and transmitted by the lens 120 are shown by solid lines. Also, in FIG. 5, the paths of the light are shown by double dot-dash lines for a case where the lens 120 does not include the lighting device 11, and the light is emitted from the light sources 110 located respectively at the first and second positions P1 and P2 and is incident on the reflector 130. The shape of the first region 121s1 of the light-emitting surface 121b of the lens 120 is such that the paths of the light emitted from the first region 121s1 substantially match the paths of the light when the lens 120 is not included and the light source 110 is located at the first position P1. Therefore, the light that is reflected by each reflecting region 133a of the first reflecting part 133g1 is the parallel light that is parallel to the Y-direction. Similarly, the shape of the second region 121s2 of the light-emitting surface 121b of the lens 120 is such that the paths of the light emitted from the second region 121s2 substantially match the paths of the light when the lens 120 is not included and the light source 110 is located at the second position P2. Therefore, the light that is reflected by each reflecting region 133a of the second reflecting part 133g2 is parallel light that is parallel to the Y-direction. Thus, according to the embodiment, the light that is emitted from the lens 120 and incident on the reflecting regions 133a is collimated by the reflecting regions 133a.

However, the reflector may have three or more reflecting parts having mutually-different focal point positions. In such a case, the light-emitting surface of the lens may be divided into three or more regions corresponding to the three or more reflecting parts of the reflector; and the light that is emitted from each region may be irradiated on the corresponding reflecting part.

The side surface 134 is positioned between the upper surface 131 and the lower surface 132 and forms a side surface of the reflector 130 other than the reflecting surface 133.

According to the embodiment, the Y-direction length of the reflector 130 is less than the X-direction length of the reflector 130. However, the size relationship of these lengths is not limited to such a size relationship.

The reflector 130 may include a resin member, and a reflective film such as a metal film, a dielectric multilayer film, or the like that forms the reflecting surface 133 located at the surface of the resin member. Also, the entire reflector 130 may be formed of a metal material. In such cases, the reflector 130 reflects the light emitted from the lens 120 by specular reflection. In such cases, the light that is emitted from each reflecting region 133a is easily made into parallel light that is parallel to the Y-direction. However, the reflector may reflect the light emitted from the lens by diffuse reflection. In such a case, the light that is emitted from each reflecting region 133a can be spread in the Z-direction.

As shown in FIG. 1, the housing 150 includes a lid member 152 and a housing member 151 that can house the light source 110, the lens 120, the reflector 130, and the substrate 140.

The housing member 151 includes a bottom plate part 151a, a first side plate part 151b, a second side plate part 151c, and a third side plate part 151d.

As shown in FIGS. 1 and 2, the bottom plate part 151a has a flat plate shape parallel to the XY-plane, and includes a first placement part 151e on which the lens 120 and the reflector 130 are located, a second placement part 151f that is adjacent to the first placement part 151e in the X-direction, is recessed lower than the first placement part 151e, and on which the substrate 140 is located, and a frame part 151g that is located at a portion of the periphery of the first placement part 151e and protrudes higher than the first placement part 151e. The frame part 151g includes a first part 151p1 configured to clamp the first flange part 122a with the light-shielding member 160, a second part 151p2 configured to clamp the second flange part 122b with the light-shielding member 160, and a third part 151p3 that has a shape corresponding to the side surface 134 of the reflector 130 and faces the side surface 134 of the reflector 130.

The first side plate part 151b is connected to the end portion of the bottom plate part 151a at the light-emitting side +Y in the Y-direction and extends in the upward direction. The first side plate part 151b has a flat plate shape parallel to the XZ-plane. A recess 156 that is concave in the downward direction is provided in the first side plate part 151b.

The second side plate part 151c is connected to the end portion of the bottom plate part 151a at the opposite side −Y in the Y-direction and extends in the Z-direction. The second side plate part 151c has a flat plate shape parallel to the XZ-plane.

The third side plate part 151d is connected to the end portion of the bottom plate part 151a in the X-direction and extends in the Z-direction. The third side plate part 151d has a flat plate shape parallel to the YZ-plane.

The lid member 152 covers the opening above the housing member 151 when located on the housing member 151. The lid member 152 is fixed to the housing member 151 by fixtures such as screws, rivets, etc.

The housing 150 is made of a resin material or a metal material. It is favorable for the inner surface of the housing 150 to be a dark color, and more favorably black. However, the color of the inner surface of the housing 150 is not limited to such colors. Also, the shape of the housing is not limited to the shape described above as long as the shape can house the components of the lighting device.

As shown in FIG. 2, the light-shielding member 160 is located between the light source 110 and the lens 120. The light-shielding member 160 has a flat plate shape parallel to the YZ-plane. An opening 161 that extends through the light-shielding member 160 in the X-direction is provided in the light-shielding member 160. The opening 161 is provided in an area that overlaps the light incident surface 121a of the lens 120 when viewed along the X-direction. The light that is emitted from the light source 110 toward the light incident surface 121a of the lens 120 is incident on the light incident surface 121a via the opening 161. On the other hand, the light that is emitted from the light source 110 toward the flange part 122 or the like is shielded by the light-shielding member 160.

The light-shielding member 160 is fixed to the housing 150 by fixtures such as screws, rivets, etc., in the state in which the flange part 122 of the lens 120 is clamped between the first part 151$p$1 and the second part 151$p$2 of the frame part 151$g$. As a result, the lens 120 is fixed to the housing 150.

For example, the light-shielding member 160 is made of a resin material or a metal material. It is favorable for the surface of the light-shielding member 160 to be a dark color, and more favorably black.

The support member 170 has a flat plate shape parallel to the YZ-plane. The support member 170 includes a front surface 171 parallel to the YZ-plane, and a back surface 172 positioned at the side opposite to the front surface 171. The substrate 140 is located on the front surface 171 and is fixed to the support member 170 by, for example, fixtures such as screws, rivets, etc. For example, the support member 170 is fixed to the housing 150 by fixtures such as screws, rivets, etc. As a result, the light source 110 is fixed to the housing 150.

For example, the support member 170 is made of a resin material or a metal material.

Display Member

As shown in FIG. 3, the display member 12 is arranged to face the reflecting surface 133 of the reflector 130 in the Y-direction. According to the embodiment, the display member 12 contacts the end portion of the reflector 130 at the light-emitting side +Y in the Y-direction. However, the display member may not contact the reflector.

The display member 12 is, for example, a light guide plate in which scratches (not illustrated) are provided in multiple arc-like shapes according to the image to be displayed. The display member 12 has a flat plate shape parallel to the XY-plane. The display member 12 is rectangular when viewed in top-view. However, the shape of the display member is not limited to such a shape. As shown in FIG. 1, the end portion of the display member 12 at the opposite side −Y in the Y-direction is located inside the recess 156 of the housing 150. For example, the display member 12 is made of a light-transmitting material such as glass, an acrylic resin, etc.

When the lighting device 11 irradiates the light on the display member 12 from the Y-direction, a portion of the light incident on the display member 12 is radiated in specific directions by the arc-like scratches. Therefore, the specific locations among the arc-like scratches corresponding to the positions of the eyes of a user appear bright to the user. Because different locations appear bright to the right and left eyes of the user when the user views the display member 12 with both eyes, a specific position above the display member 12 appears bright. Therefore, the user can view a three-dimensional image corresponding to the multiple arc-like scratches above the display member 12. Thus, the display member 12 uses an arc three-dimensional display to display the three-dimensional image. In FIG. 5, the light that is incident on the display member 12 is emitted in the Y-direction from the display member 12. However, a portion of the light incident on the display member 12 may be oriented in a direction different from the Y-direction by the arc-like scratches.

However, the structure of the display member is not limited to the structure described above as long as a three-dimensional image can be displayed. For example, the display member may be a hologram sheet; and the three-dimensional image may be displayed by holography.

A usage example of the three-dimensional image display device 10 according to the embodiment will now be described.

When the light source 110 is lit as shown in FIG. 5, the greater part of the light emitted by the light source 110 is incident on the light incident surface 121$a$ of the lens 120.

As described above, the angle θ$t$1 between the X-direction and the tangent TL1 at the first end portion 121$t$1 of the light-emitting surface 121$b$ of the lens 120 is less than the angle θ$t$2 between the X-direction and the second end portion 121$t$2 of the light-emitting surface 121$b$. Therefore, the refraction angle of the light L1 that is incident on the lens 120 and emitted from the first end portion 121$t$1 is greater than the refraction angle of the light L2 that is incident on the lens 120 and emitted from the second end portion 121$t$2. As a result, the angle between the light L1 and the optical axis C is less than the angle between the light L2 and the optical axis C. Therefore, the light distribution angle θL1 emitted from the first region 121$s$1 of the light-emitting surface 121$b$ is less than the light distribution angle θL2 of the light emitted from the second region 121$s$2 of the light-emitting surface 121$b$.

Thus, the spreading of the light emitted from the lens 120 toward the light-emitting side +Y in the Y-direction can be suppressed. As a result, the Y-direction length of the reflector 130 can be reduced. Also, even if the reflector 130 and the display member 12 approach each other, the light that is emitted from the lens 120 can be prevented from being directly incident on the display member 12 without traveling via the reflector 130.

The greater part of the light emitted from the first region 121$s$1 of the lens 120 is irradiated on the first reflecting part 133$g$1 of the reflector 130; and the greater part of the light emitted from the second region 121$s$2 of the lens 120 is irradiated on the second reflecting part 133$g$2 of the reflector 130. As described above, the first region 121$s$1 has a shape such that the paths of the light emitted from the first region 121$s$1 substantially match the paths of the light when the lens 120 is not included and the light source 110 is located at the first position P1. Therefore, the light that is reflected by each reflecting region 133$a$ of the first reflecting part 133$g$1 is parallel to the Y-direction. Similarly, the second region 121$s$2 has a shape such that the paths of the light emitted from the second region 121$s$2 substantially match the paths of the light when the lens 120 is not included and the light source 110 is located at the second position P2. Therefore, the light that is reflected by each reflecting region 133$a$ of the second reflecting part 133$g$2 is parallel to the Y-direction. Also, the light that is emitted from the light source 110 is incident on the display member 12 by traveling via the lens 120 and the reflector 130 instead of being directly incident on the display member 12. Therefore, uneven illuminance of the light irradiated on the display member 12 can be suppressed.

The greater part of the light reflected by the reflecting regions 133$a$ is incident on the display member 12. As a result, a three-dimensional image is displayed above the display member 12. As described above, because the light reflected by each reflecting region 133$a$ is parallel light that is parallel to the Y-direction, parallel light from one direction is irradiated on the display member 12. Therefore, the three-dimensional image that is displayed by the display member 12 can be clear.

Effects of the embodiment will now be described.

In the lighting device 11 according to the embodiment, the multiple reflecting regions 133$a$ of the reflector 130 are arranged with the steps 133b interposed between the multiple reflecting regions 133a so that the reflecting regions 133a positioned further toward the light-emitting side +Y in the Y-direction have greater distances do from the lens 120. Therefore, the Y-direction length of the reflector can be reduced. The lighting device 11 and the three-dimensional image display device 10 can be smaller thereby.

Also, the light distribution angle θL1 of the light emitted from the first part 120a of the lens 120 positioned further in the Y-direction toward the light-emitting side +Y than the optical axis C of the light incident on the lens 120 is less than the light distribution angle θL2 of the light emitted from the second part 120b of the lens 120 positioned further toward the opposite side −Y than the optical axis C in the Y-direction. Therefore, the spreading of the light emitted from the lens 120 toward the light-emitting side +Y in the Y-direction can be suppressed. As a result, the light that is emitted from the lens 120 but is not irradiated on the reflector 130 can be suppressed while reducing the Y-direction length of the reflector 130. In particular, when the lighting device 11 is applied to the three-dimensional image display device 10, the direct incidence of the light emitted from the lens 120 on the display member 12 without traveling via the reflector 130 can be suppressed even when the reflector 130 and the display member 12 approach each other. As a result, the three-dimensional image that is displayed by the display member 12 can be clear.

Also, the lens 120 includes the light-emitting surface 121b having a convex curved shape; and the angle θt1 between the X-direction and the tangent TL1 at the first end portion 121t1 of the light-emitting surface 121b at the light-emitting side +Y in the Y-direction is less than the angle θt2 between the X-direction and the tangent TL2 of the second end portion 121t2 of the light-emitting surface 121b at the opposite side −Y in the Y-direction. Thus, the light distribution angle θL1 can be set to be less than the light distribution angle θL2 by the simple method of adjusting the curvature of the light-emitting surface 121b.

Also, the adjacent reflecting regions 133a partially overlap when viewed along the X-direction. Therefore, the Y-direction length of the reflector 130 can be further reduced.

Also, the first reflecting part 133g1 that includes some of the multiple reflecting regions 133a has a focal point at the first position P1. The second reflecting part 133g2 that includes some other of the multiple reflecting regions 133a has a focal point at a second position P2 that is positioned further toward the opposite side −Y than the first reflecting part 133g1 in the Y-direction and is more proximate to the reflector 130 than the first position P1. Also, the light that is emitted from the first part 120a of the lens 120 is irradiated on the first reflecting part 133g1; and the light that is emitted from the second part 120b of the lens 120 is irradiated on the second reflecting part 133g2. Thus, the design of the lens 120 is easy because it is sufficient to divide the reflecting surface 133 of the reflector 130 into the two reflecting parts 133g1 and 133g2 and to design the first and second parts 120a and 120b of the lens 120 according to the positions P1 and P2 of the focal points of the reflecting parts 133g1 and 133g2.

Also, the light-emitting surface 121b of the lens 120 includes the first region 121s1 that is positioned further toward the light-emitting side +Y than the optical axis C in the Y-direction, and the second region 121s2 that is positioned further toward the opposite side −Y than the optical axis C in the Y-direction. The length d1 in the Y-direction of the first region 121s1 is less than the length d2 in the Y-direction of the second region 121s2. Therefore, the spreading of the light emitted from the lens 120 toward the light-emitting side +Y in the Y-direction can be suppressed.

Also, the light that is emitted from the lens 120 and incident on the reflecting regions 133a is collimated by the reflecting regions 133a. In other words, the light that is emitted from the lens 120 is non-parallel; and the reflector 130 collimates the light emitted from the lens 120. As a result, the irradiation width of the light emitted from the reflector 130 can be spread while reducing the Y-direction length of the reflector 130.

SECOND EMBODIMENT

A second embodiment will now be described.

Figure 6:
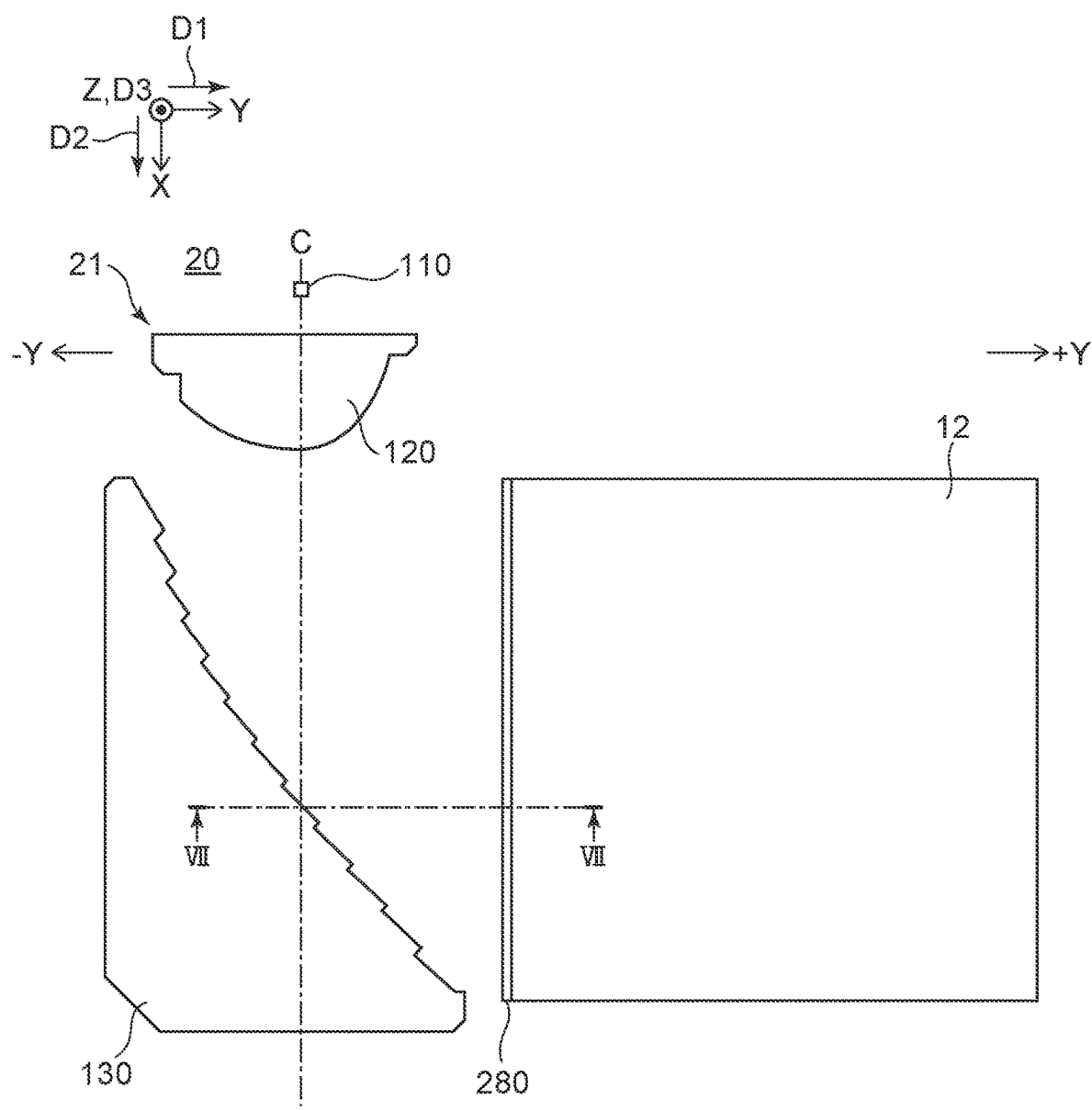
FIG. 6 is a top view showing a three-dimensional image display device according to a second embodiment.

FIG. 6 is a top view showing a three-dimensional image display device according to the embodiment.

Figure 7:
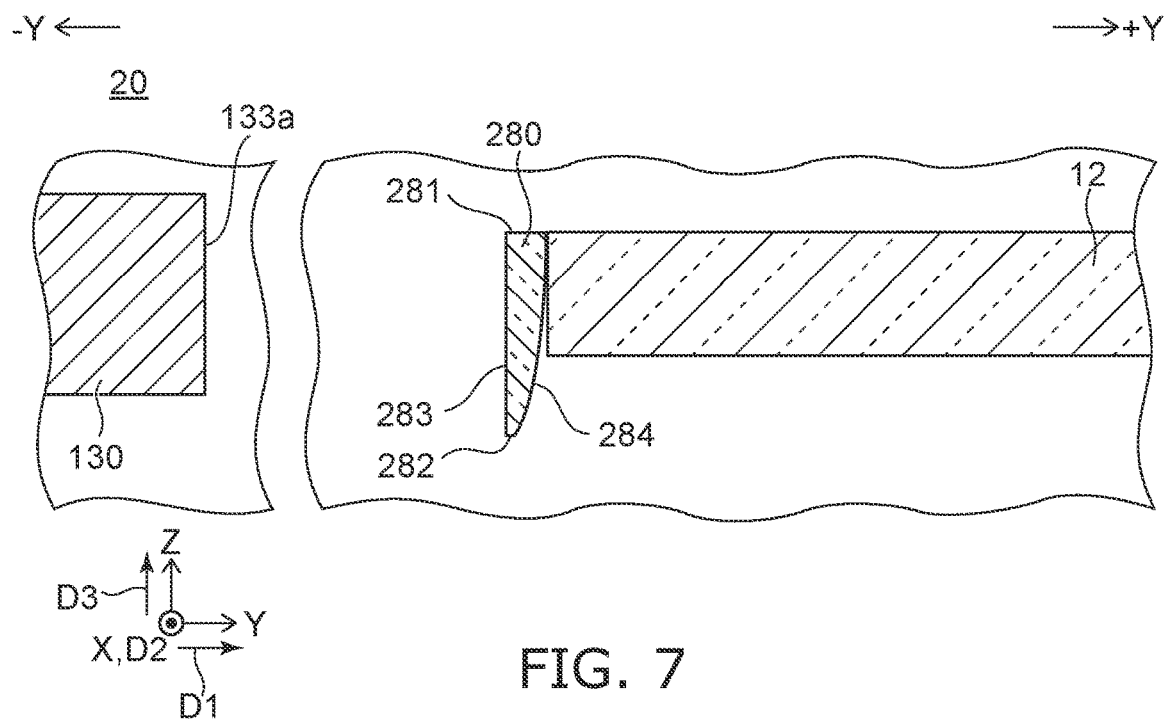
FIG. 7 is a cross-sectional view along line VII-VII of FIG. 6.

FIG. 7 is a cross-sectional view along line VII-VII of FIG. 6.

The three-dimensional image display device 20 that includes a lighting device 21 according to the embodiment differs from the lighting device 11 according to the first embodiment in that another lens 280 on which the light emitted from the reflector 130 is incident is further included.

As a general rule in the following description, only the differences with the first embodiment are described. Other than the matters described below, the embodiment is similar to the first embodiment. This is similar for the other embodiments described below.

The other lens 280 is positioned between the reflector 130 and the display member 12. The other lens 280 extends with the X-direction as the longitudinal direction. Each cross section of the other lens 280 has the same shape orthogonal to the X-direction. Here, "the shape of the cross section is the same" means that the shape of the cross section is the same within a practical range that allows errors caused by manufacturing accuracy, etc. The other lens 280 is, for example, a cylindrical lens. As shown in FIG. 7, the other lens 280 includes an upper surface 281, a lower surface 282, a light incident surface 283, and a light-emitting surface 284.

The upper surface 281 is a flat surface parallel to the XY-plane. The lower surface 282 is positioned below the upper surface 281 and is a flat surface parallel to the XY-plane. The light incident surface 283 is connected to the end portion of the upper surface 281 at the opposite side −Y in the Y-direction and the end portion of the lower surface 282 at the opposite side −Y in the Y-direction, and is a flat surface parallel to the XZ-plane. The light-emitting surface 284 is connected to the end portion of the upper surface 281 at the light-emitting side +Y in the Y-direction and the end portion of the lower surface 282 at the light-emitting side +Y in the Y-direction. The light-emitting surface 284 is a portion of a side surface of a circular column. The light-emitting surface 284 is connected to the end portion of the lower surface 282 at the light-emitting side +Y in the Y-direction and is curved along the upward direction toward the light-emitting side +Y in the Y-direction.

However, the shape of the other lens is not limited to such a shape. For example, the other lens may have a shape that is symmetric with respect to a plane that passes through the Z-direction center of the other lens and is parallel to the XY-plane, that is, a shape that is vertically symmetric. Also, for example, the light-emitting surface of the other lens may be a curved surface other than the side surface of a circular column, and may be an oblique surface that is oblique to the XZ-plane.

The greater part of the light reflected by the reflecting regions 133a of the reflector 130 is incident on the light incident surface 283 of the other lens 280. The greater part of the light incident on the other lens 280 is the emission from the light-emitting surface 284 of the other lens 280. The light that is emitted from the light-emitting surface 284 spreads in a third direction D3 orthogonal to the first direction D1 and the second direction. According to the embodiment, the third direction D3 corresponds to the Z-direction.

Effects of the embodiment will now be described.

The lighting device 21 according to the embodiment further includes the other lens 280 on which the light reflected by the reflector 130 is incident, that extends with the X-direction as the longitudinal direction, and that controls the spreading in the Z-direction of the light emitted from the reflector 130. Therefore, the spreading in the Z-direction of the light emitted from the reflector 130 can be controlled by the other lens 280.

When the light emitted from each reflecting region 133a is parallel light that is parallel to the Y-direction, the other lens 280 can control the spreading in the Z-direction of the light emitted from the reflecting regions 133a while substantially maintaining the state in which the light emitted from the reflecting regions 133a is parallel to the Y-direction when viewed in top-view. Therefore, when the lighting device 21 is applied to the three-dimensional image display device 20, the other lens 280 can irradiate the light in the wide area of the display member 12 while suppressing blur of the three-dimensional image displayed by the display member 12. Also, when the lighting device 21 is applied to a sterilization device or the like, the sterilization range can be increased because the light can be spread in the Z-direction.

THIRD EMBODIMENT

A third embodiment will now be described.

Figure 8:
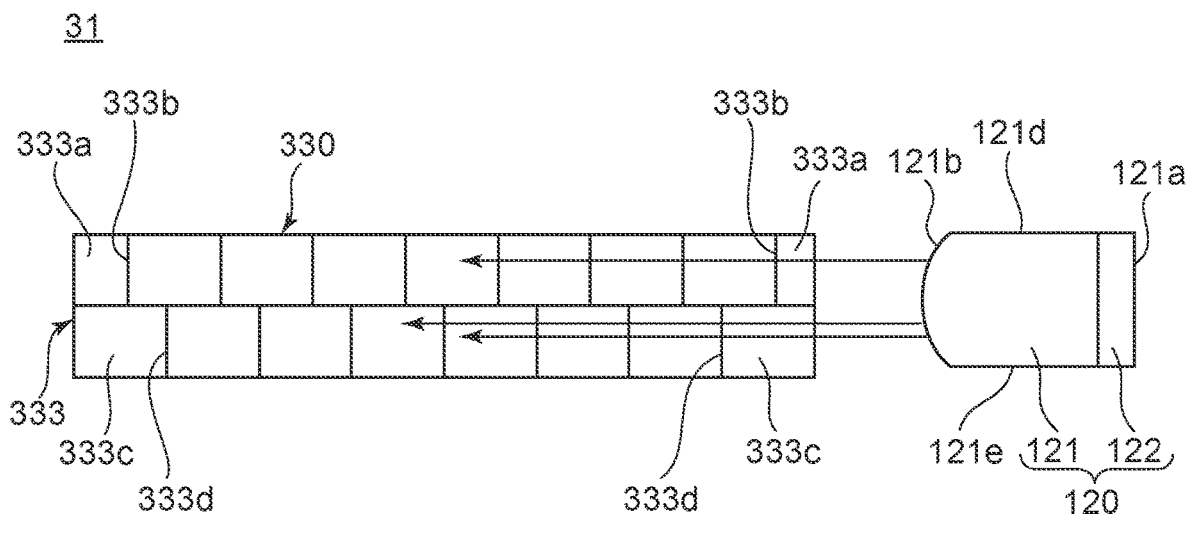
FIG. 8 is a side view showing a lens and a reflector of a lighting device according to a third embodiment.

FIG. 8 is a side view showing a lens and a reflector of a lighting device according to the embodiment.

The configuration of a reflector 330 of the lighting device 31 according to the embodiment is different from that of the lighting device 11 according to the first embodiment.

A reflecting surface 333 of the reflector 330 includes multiple first reflecting regions 333a, multiple steps 333b, multiple second reflecting regions 333c, and multiple steps 333d. Each first reflecting region 333a and each second reflecting region 333c reflect the light emitted from the lens 120 in the Y-direction.

The multiple first reflecting regions 333a are arranged in one column with the steps 333b interposed between the multiple first reflecting regions 333a so that the first reflecting regions 333a positioned further toward the light-emitting side +Y in the Y-direction have greater distances from the lens 120 in the X-direction.

Similarly, the multiple second reflecting regions 333c are arranged in one column with the steps 333d interposed between the multiple second reflecting regions 333c so that the second reflecting regions 333c positioned further toward the light-emitting side +Y in the Y-direction have greater distances from the lens 120 in the X-direction.

The column of the multiple first reflecting regions 333a arranged in one column and the column of the multiple second reflecting regions 333c arranged in one column are arranged in the Z-direction. Also, the multiple first reflecting regions 333a and the multiple second reflecting regions 333c are arranged in a staggered configuration in the Z-direction. Accordingly, the steps 333b and the steps 333d are located not to be adjacent to each other in the Z-direction.

Effects of the embodiment will now be described.

The greater part of the light emitted from the lens 120 is incident on the multiple first reflecting regions 333a and the multiple second reflecting regions 333c of the reflector 330. The regions between the light reflected by the first reflecting regions 333a tend to be dark due to the steps 333b between the multiple first reflecting regions 333a. Similarly, the regions between the light reflected by the second reflecting regions 333c tend to be dark due to the steps 333d between the multiple second reflecting regions 333c. In contrast, according to the embodiment, the multiple first reflecting regions 333a and the multiple second reflecting regions 333c are arranged in a staggered configuration in the Z-direction; therefore, the X-direction positions of the optical axes of the light reflected by the second reflecting regions 333c are shifted from the X-direction positions of the optical axes of the light reflected by the first reflecting regions 333a when viewed in top-view. Therefore, the regions between the light reflected by the first reflecting regions 333a and between the light reflected by the second reflecting regions 333c can be prevented from being highly noticeable as dark portions.

The lighting device may be configured to include at least a light source and a lens having an asymmetric light distribution with respect to the optical axis of the incident light. In other words, the lighting device may not include a reflector in which steps are provided in the reflecting surface as described in the multiple embodiments above. In such a case as well, an effect can be obtained in which the light distribution of the light emitted from the lens is asymmetric with respect to the optical axis. Such a lighting device may include a reflector with no steps in the reflecting surface instead of a reflector having steps in the reflecting surface. Also, such a lighting device may include a reflector with no steps in the reflecting surface, and may be used in combination with a display member in a three-dimensional image display device. Also, such a lighting device may include neither a reflector with steps provided in the reflecting surface nor a reflector with no steps provided in the reflecting surface, and may be used in combination with a display member in a three-dimensional image display device, etc. Also, such a lighting device may include neither a reflector with steps provided in the reflecting surface nor a reflector with no steps provided in the reflecting surface, and may be used alone as signboard illumination, etc.

Also, the lighting device may be configured to include at least a light source part including one or more light sources, and a reflector with steps provided in the reflecting surface. In other words, the lighting device may not include a lens having an asymmetric light distribution with respect to the optical axis of the incident light. In such a case as well, an effect can be obtained in which the reflector can be smaller in at least the first direction. Such a lighting device may include a lens having a symmetric light distribution with respect to the optical axis of the incident light instead of a lens having an asymmetric light distribution. Also, such a lighting device may include a lens having a symmetric light distribution and may be used in combination with a display member in a three-dimensional image display device. Also, such a lighting device may include neither a lens having an asymmetric light distribution nor a lens having a symmetric light distribution, and may be used in combination with a display member in a three-dimensional image display device, etc. Also, such a lighting device may include neither a lens having an asymmetric light distribution nor a lens having a symmetric light distribution, and may be used alone in a sterilization device, etc. When the lighting device cannot include either a lens having an asymmetric light distribution or a lens having a symmetric light distribution, light sources may be located at the focal points of the reflector.

For example, the invention can be utilized in a three-dimensional image display device, a sterilization device, a wall lighting, or an area sensor device.

The invention claimed is:

1. A lighting device, comprising:
   a light source;
   a lens on which light emitted from the light source is incident, the lens including a light-emitting surface having a convex curved shape; and
   a reflector including a plurality of first reflecting regions, each of the first reflecting regions reflecting, in a first direction, light emitted from the lens, the first direction crossing an optical axis of light incident on the lens,
   the plurality of first reflecting regions being arranged with steps interposed between the plurality of first reflecting regions so that the first reflecting regions positioned further toward a light-emitting side of the reflector in the first direction have greater distances from the lens in a second direction, the optical axis extending in the second direction,
   a light distribution angle of light emitted from a first part of the lens being less than a light distribution angle of light emitted from a second part of the lens,
   the first part being positioned at the light-emitting side of the optical axis in the first direction,
   the second part being positioned at an opposite side of the optical axis opposite to the light-emitting side in the first direction,
   an angle between the second direction and a tangent at a first end portion of the light-emitting surface being less than an angle between the second direction and a tangent at a second end portion of the light-emitting surface,
   the first end portion being at the light-emitting side in the first direction,
   the second end portion being at the opposite side in the first direction.

2. A three-dimensional image display device, comprising:
   the lighting device according to claim 1; and
   a display member configured to display a three-dimensional image by light emitted from the lighting device being incident on the display member.

3. The lighting device according to claim 1, wherein adjacent first reflecting regions among the plurality of first reflecting regions partially overlap when viewed along the second direction.

4. The lighting device according to claim 1, further comprising:
   a second lens on which light reflected by the reflector is incident,
   a longitudinal direction of the second lens extending in the second direction,
   the second lens controlling the light reflected by the reflector to spread in a third direction,
   the third direction being orthogonal to the first and second directions.

5. The lighting device according to claim 1, wherein the reflector further includes a plurality of second reflecting regions,
   each of the second reflecting regions reflect the light emitted from the lens in the first direction,
   the plurality of second reflecting regions is arranged with steps interposed between the plurality of second reflecting regions so that the second reflecting regions positioned further toward the light-emitting side in the first direction have greater distances from the lens in the second direction,
   a column in which the plurality of first reflecting regions is arranged in one column and a column in which the plurality of second reflecting regions is arranged in one column are arranged in a third direction,
   the third direction is orthogonal to the first and second directions, and
   the plurality of second reflecting regions and the plurality of first reflecting regions are arranged in a staggered configuration in the third direction.

6. The lighting device according to claim 1, wherein
   a first reflecting part includes some of the plurality of first reflecting regions,
   the first reflecting part has a focal point at a first position,
   a second reflecting part includes some other of the plurality of first reflecting regions,
   the second reflecting part is positioned further toward the opposite side than the first reflecting part in the first direction,
   the second reflecting part has a focal point at a second position, and
   the second position is more proximate to the reflector than the first position.

7. The lighting device according to claim 6, wherein
   the light emitted from the first part is irradiated on the first reflecting part, and
   the light emitted from the second part is irradiated on the second reflecting part.

8. The lighting device according to claim 1, wherein
   the lens includes a light-emitting surface having a convex curved shape,
   the light-emitting surface includes:
      a first region positioned further toward the light-emitting side than the optical axis in the first direction; and
      a second region positioned further toward the opposite side than the optical axis in the first direction, and
   a length in the first direction of the first region is less than a length in the first direction of the second region.

9. The lighting device according to claim 1, wherein light emitted from the lens and incident on the first reflecting regions is collimated by the first reflecting regions.

10. A lighting device, comprising:
    a light source;
    a first lens on which light emitted from the light source is incident;
    a reflector including a plurality of first reflecting regions, each of the first reflecting regions reflecting, in a first direction, light emitted from the first lens, the first direction crossing an optical axis of light incident on the first lens; and
    a second lens on which light reflected by the reflector is incident,
    the plurality of first reflecting regions being arranged with steps interposed between the plurality of first reflecting regions so that the first reflecting regions positioned further toward a light-emitting side of the reflector in the first direction have greater distances from the first lens in a second direction, the optical axis extending in the second direction, a light distribution angle of light emitted from a first part of the first lens being less than a light distribution angle of light emitted from a second part of the first lens, the first part being positioned at the light-emitting side of the optical axis in the first direction, the second part being positioned at an opposite side of the optical axis opposite to the light-emitting side in the first direction, a longitudinal direction of the second lens extending in the second direction, the second lens controlling the light reflected by the reflector to spread in a third direction, the third direction being orthogonal to the first and second directions.

11. The lighting device according to claim 10, wherein the reflector further includes a plurality of second reflecting regions, each of the second reflecting regions reflect the light emitted from the first lens in the first direction, the plurality of second reflecting regions is arranged with steps interposed between the plurality of second reflecting regions so that the second reflecting regions positioned further toward the light-emitting side in the first direction have greater distances from the first lens in the second direction, a column in which the plurality of first reflecting regions is arranged in one column and a column in which the plurality of second reflecting regions is arranged in one column are arranged in a third direction, the third direction is orthogonal to the first and second directions, and the plurality of second reflecting regions and the plurality of first reflecting regions are arranged in a staggered configuration in the third direction.

12. The lighting device according to claim 10, wherein a first reflecting part includes some of the plurality of first reflecting regions, the first reflecting part has a focal point at a first position, a second reflecting part includes some other of the plurality of first reflecting regions, the second reflecting part is positioned further toward the opposite side than the first reflecting part in the first direction, the second reflecting part has a focal point at a second position, and the second position is more proximate to the reflector than the first position.

13. The lighting device according to claim 12, wherein the light emitted from the first part is irradiated on the first reflecting part, and the light emitted from the second part is irradiated on the second reflecting part.

14. The lighting device according to claim 10, wherein the first lens includes a light-emitting surface having a convex curved shape, the light-emitting surface includes:
 a first region positioned further toward the light-emitting side than the optical axis in the first direction; and
 a second region positioned further toward the opposite side than the optical axis in the first direction, and
a length in the first direction of the first region is less than a length in the first direction of the second region.

15. The lighting device according to claim 10, wherein light emitted from the first lens and incident on the first reflecting regions is collimated by the first reflecting regions.

16. A three-dimensional image display device, comprising:
the lighting device according to claim 10; and
a display member configured to display a three-dimensional image by light emitted from the lighting device being incident on the display member.

17. A lighting device, comprising:
a light source;
a lens on which light emitted from the light source is incident; and
a reflector including a plurality of first reflecting regions, each of the first reflecting regions reflecting, in a first direction, light emitted from the lens, the first direction crossing an optical axis of light incident on the lens,
the plurality of first reflecting regions being arranged with steps interposed between the plurality of first reflecting regions so that the first reflecting regions positioned further toward a light-emitting side of the reflector in the first direction have greater distances from the lens in a second direction, the optical axis extending in the second direction,
a light distribution angle of light emitted from a first part of the lens being less than a light distribution angle of light emitted from a second part of the lens,
the first part being positioned at the light-emitting side of the optical axis in the first direction,
the second part being positioned at an opposite side of the optical axis opposite to the light-emitting side in the first direction,
the lens including a light-emitting surface having a convex curved shape,
the light-emitting surface including:
 a first region positioned further toward the light-emitting side than the optical axis in the first direction; and
 a second region positioned further toward the opposite side than the optical axis in the first direction,
a length in the first direction of the first region being less than a length in the first direction of the second region.

18. The lighting device according to claim 17, wherein light emitted from the lens and incident on the first reflecting regions is collimated by the first reflecting regions.

19. A three-dimensional image display device, comprising:
the lighting device according to claim 17; and
a display member configured to display a three-dimensional image by light emitted from the lighting device being incident on the display member.

* * * * *